(12) United States Patent
Mühle

(10) Patent No.: US 6,719,299 B2
(45) Date of Patent: Apr. 13, 2004

(54) FLAP SEAL

(75) Inventor: Hubertus Mühle, Düsseldorf (DE)

(73) Assignee: Crane Process Flow Technologies GmbH (DE)

( * ) Notice: Subject to any disclaimer, the term of this patent is extended or adjusted under 35 U.S.C. 154(b) by 0 days.

(21) Appl. No.: 10/239,449

(22) PCT Filed: Mar. 13, 2001

(86) PCT No.: PCT/EP01/02770
§ 371 (c)(1),
(2), (4) Date: Sep. 20, 2002

(87) PCT Pub. No.: WO02/01098
PCT Pub. Date: Jan. 3, 2002

(65) Prior Publication Data
US 2003/0047886 A1 Mar. 13, 2003

(30) Foreign Application Priority Data

Jun. 27, 2000 (DE) .......................................... 100 30 300

(51) Int. Cl.⁷ ........................... F16J 15/14; F16J 15/02; B21D 53/84; F16B 43/00; F16L 17/00
(52) U.S. Cl. ..................... 277/590; 29/888.3; 285/910; 411/536; 277/591; 277/628; 277/637
(58) Field of Search ................................. 277/313, 316, 277/590, 591, 598, 602, 606, 608, 609, 616, 627, 628, 630, 637, 640, 641, 644, 650, 652, 653; 411/535, 536, 542, 544; 285/910; 29/888.3, 888.4

(56) References Cited

U.S. PATENT DOCUMENTS

| | | | | |
|---|---|---|---|---|
| 1,856,051 A | * | 4/1932 | Fryling | 277/609 |
| 2,713,482 A | * | 7/1955 | Stapleton | 267/162 |
| 2,852,291 A | * | 9/1958 | Hults | 277/637 |
| 4,293,116 A | | 10/1981 | Hinrichs | |
| 4,396,199 A | | 8/1983 | Boyd et al. | |
| 4,405,138 A | * | 9/1983 | Skrycki | 277/591 |
| 5,044,641 A | * | 9/1991 | Belter | 277/598 |
| 5,375,851 A | * | 12/1994 | Mockenhaupt | 277/598 |
| 5,489,180 A | * | 2/1996 | Ichihara et al. | 411/544 |
| 5,803,465 A | * | 9/1998 | Schweiger | 277/593 |
| 5,979,905 A | * | 11/1999 | Fischer et al. | 277/591 |
| 6,027,124 A | * | 2/2000 | Ishida et al. | 277/595 |
| 6,283,480 B1 | * | 9/2001 | Miura et al. | 277/593 |
| 6,328,513 B1 | * | 12/2001 | Niwa et al. | 411/339 |

FOREIGN PATENT DOCUMENTS

| | | |
|---|---|---|
| DE | G 83 01 963 | 7/1983 |
| DE | 42 38 669 | 5/1994 |

(List continued on next page.)

Primary Examiner—Anthony Knight
Assistant Examiner—Vishal Patel
(74) Attorney, Agent, or Firm—R W Becker & Associates; R W Becker

(57) ABSTRACT

The invention relates to a flap seal in the form of a lamella seal, comprising at least three essentially flat individual rings (1, 10) lying one on top of another in a bundle-type form. Said individual rings (1, 10) comprise an inner part which is respectively defined by an inner circumferential surface (2, 11). The outer-lying individual rings (1) are covering rings, and the inner-lying individual rings (10) are sealing rings. High-quality sealing surfaces can be produced by allocating positioning means to the covering rings (1) for positioning said covering rings (1) in relation to one another in the circumferential direction and/or in relation to inner-lying sealing rings (10) in the radial direction. The positioning means also enable a relative movement in the axial direction.

10 Claims, 2 Drawing Sheets

FOREIGN PATENT DOCUMENTS

| | | |
|---|---|---|
| DE | 296 12 183 | 10/1996 |
| DE | 297 08 230 | 9/1997 |
| DE | 196 42 661 | 4/1998 |
| DE | 298 22 791 | 12/1998 |
| EP | 0 499 821 | 8/1992 |
| EP | 0 682 198 | 11/1995 |
| EP | 0 771 976 | 7/1997 |
| FR | 2 294 376 | 7/1976 |
| FR | 268 32 89 | 5/1993 |
| JP | 57-184767 | 11/1957 |

\* cited by examiner

FLAP SEAL

BACKGROUND OF THE INVENTION

The present invention relates to a flap seal of the type for a lamella seal.

Flap seals of this type are known in the practice and are deployed, for example, with throttle valves in steam conduits.

A seal of this type is disclosed, for example, in DE 298 22 791 U1. The flap seal shown therein includes two cover rings which surround a packet of sealing rings. This flap seal is formed by initially assembling together annular discs in a packet-type manner. The metallic rings include on the inner sides thereof inwardly oriented noses which, upon mounting of the disc packets, together under axial pressure, are welded to one another and the flap seal is thus permanently secured together. After this welding, the flap seal is brought by cutting or shaving into its designated form, which corresponds to the sleeve surface of a conical section of an inclined or tapered cone.

Otherwise, it is known in connection with conventional flap seals to assemble these together as well prior to the cutting or shaving work, with the individual lamellae being adhered to one another.

It is problematic in connection with these flap seals that they can no longer be divided or separated from one another after the cutting or shaving work. For this reason, the cover discs, which are typically formed of metal, and the sealing discs disposed therebetween, cannot be de-burred separately from one another. The de-burring of the fixed packets of discs comprised of materials which typically differ from one another therefore does not lead to an optimal surface quality of the seal surface.

It is, therefore, the object of the present invention to create a flap seal the individual discs of which can be collectively worked or handled while the individual discs are securely mounted to one another, the individual discs of which can, further, be separated from one another for de-burring work thereon as desired and, following the de-burring, can be assembled together again in substantially the original orientation.

SUMMARY OF THE INVENTION

Due to the arrangement of positioning means relative to the cover rings, which position the cover rings relative to one another in the circumferential direction and/or relative to the inwardly disposed seal rings in a radial direction and which permit relative movement of the cover rings in the axial direction, the rings can be assembled together in the designated orientation, axially pressed, and then worked on in the assembled condition. They can then be again separated in the axial direction. The rings can then be de-burred and again assembled together in the original orientation. The pressing of the flap seal in the valve during the mounting step occurs, as well, in the axial direction.

Advantageous embodiments of the invention are set forth in the dependent claims. In view of the fact that, in connection with the inventive method, there initially occurs a stacking of the individual rings in the designated serial arrangement, whereby the individual rings are releasably fixedly secured to one another radially and in the circumferential direction, then the finishing of the outer contour via cutting or shaving work, the thereafter-following separation of the individual rings, the de-burring of the individual rings, to the extent required, and, eventually, the assembling together of the individual rings in the original orientation and serial arrangement, as well as a mounting of the individual rings under axial pressure, a flap seal is produced whose individual rings have been finished or worked in a predetermined manner. The mounting then follows again in the arrangement by which the designated contour is ensured. The configuration of the worked surfaces of the individual rings is substantially improved in comparison to that effected by the known processes.

BRIEF DESCRIPTION OF THE DRAWINGS

There follows hereinafter a description of an embodiment of the present invention with reference to the figures of the drawing.

The figures of the drawings show:

FIG. 3: A seal ring shown in a top plan view, as well as

DESCRIPTION OF PREFERRED EMBODIMENTS

Figure 1:
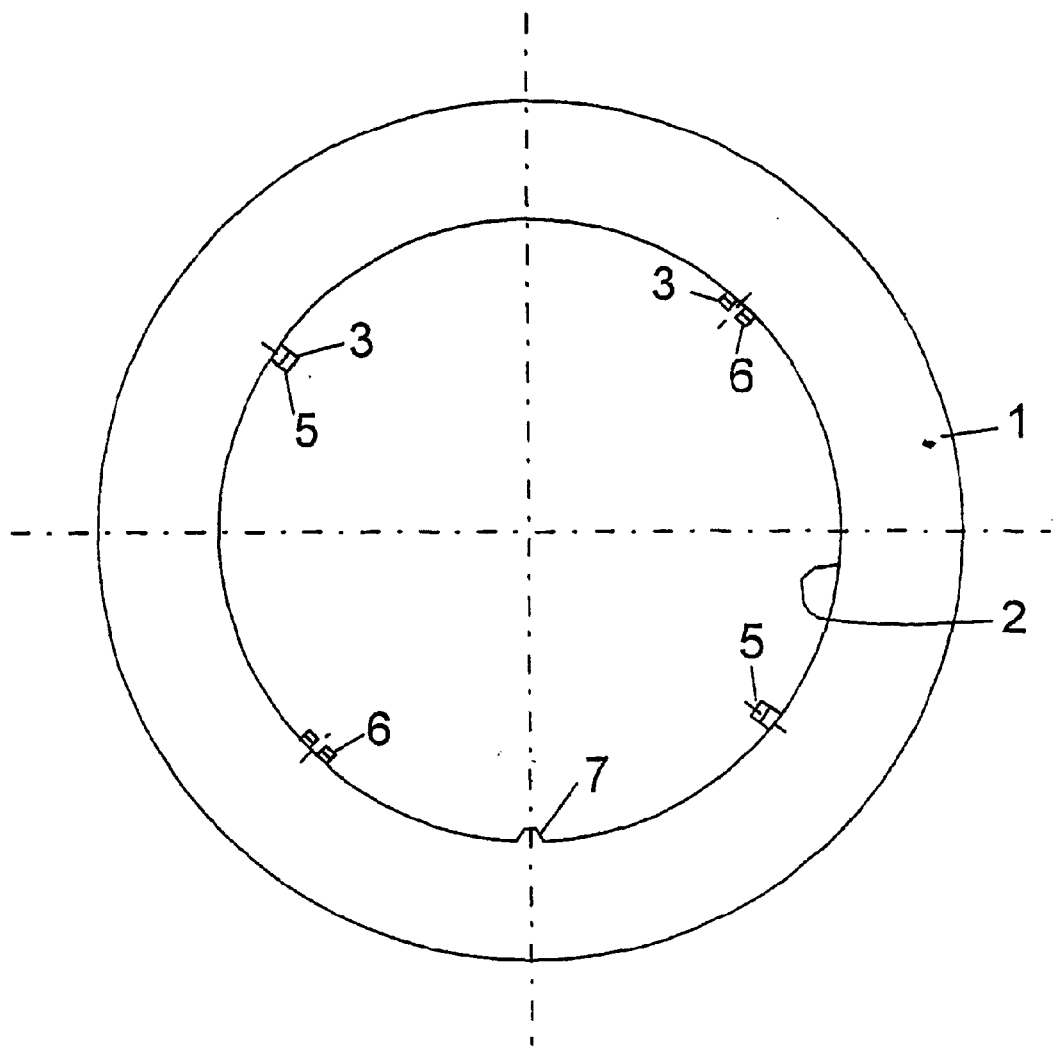
FIG. 1: A cover ring of an inventive flap seal shown in an axial plan view thereof.

As seen in FIG. 1, a cover ring 1 of an inventive flap seal is shown in an axial plan view. The cover ring 1, as is the case with other typical individual rings of a flap seal, is substantially annularly shaped before it is subjected to working. Individual clips 3 are provided as positioning means on an inner circumferential surface 2 of the cover ring 1,. The clips 3 are, in this connection, comprised of four positioning means, each disposed at respective positions around the circumferential direction 90 degrees offset from one another. In this connection, two of the offset positions, which are offset to one another by 180 degrees, are provided with a clip in the form of a nose-shaped positioning means 5, while the other two offset positions, which lie between the nose-shaped positioning means 5, have respective clips disposed thereat in the form of fork-shaped positioning means 6. The individual clips 3 of the fork-shaped positioning means 6 are disposed at a spacing from one another which corresponds to the width of a nose-shaped positioning means 5. The clips 3 are bent at an angle of approximately 90 degrees relative to the plane of the cover ring 1 in the axial direction and extend to one side of the plane of the cover ring 1.

Continuing, on the inner circumferential surface, an index marker 7 is disposed between a nose-shaped positioning means 5 and a fork-shaped positioning means 6.

Figure 2:
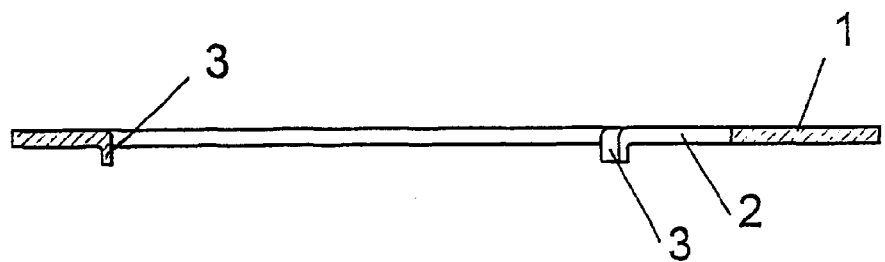
FIG. 2: The cover ring shown in FIG. 1 in a sectional side view thereof.

FIG. 2 shows the cover ring 1 shown in FIG. 1 in a side sectional view thereof. It can be seen that the clips 3 are formed as individually formed material portions bent downwardly from the plane of the cover ring 1.

Figure 3:
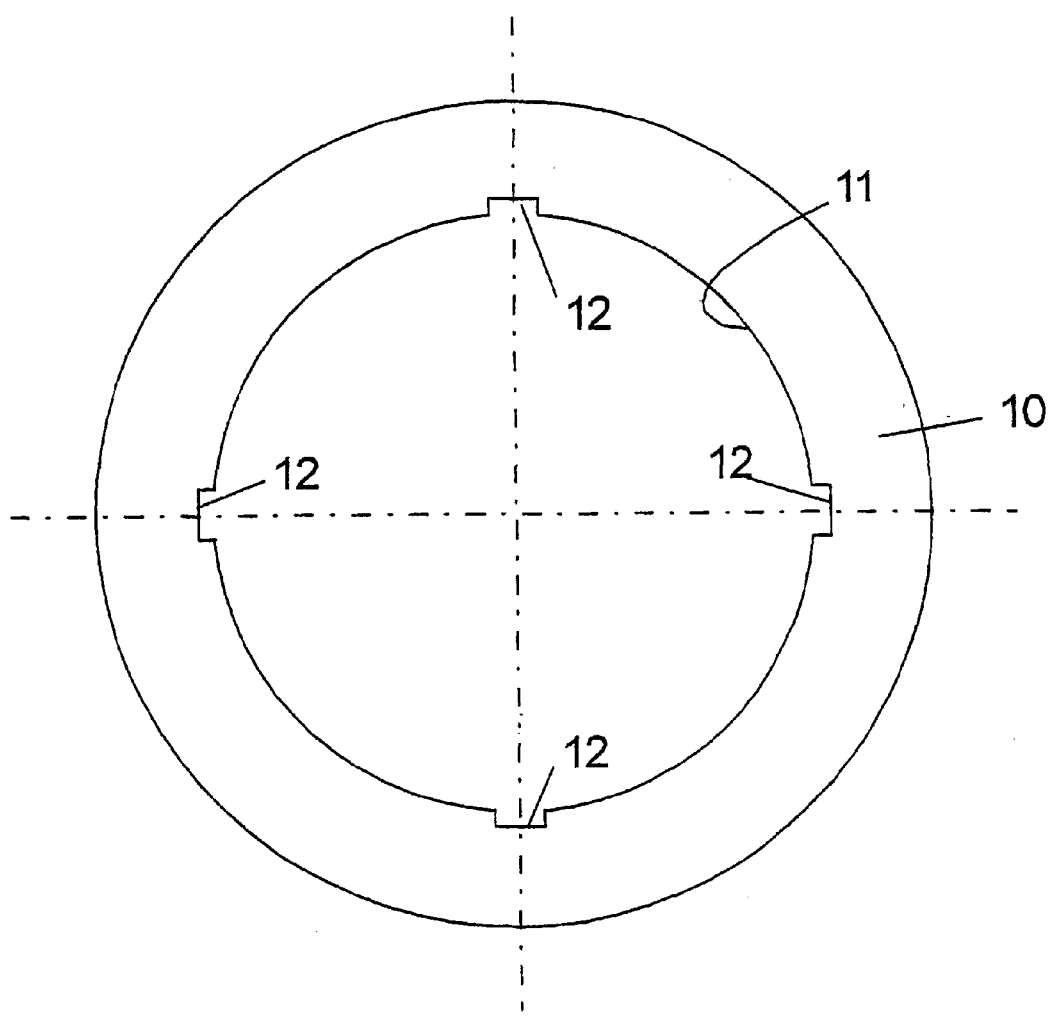

FIG. 3 shows a seal ring 10 in a plan view thereof along the axial direction, corresponding to the illustration shown in FIG. 1. The seal ring 10 is, as well, annularly shaped before the working thereof and comprises an inner circumferential surface 11, having a respective cutout 12 formed at each respective one of four positions disposed at 90 degree offsets from another. The cutouts 12 are dimensioned to the full axial height of the inner circumferential surface 11 and extend in the circumferential direction to a respective width which corresponds to the outer dimension of a fork-shaped positioning means 6.

Figure 4:
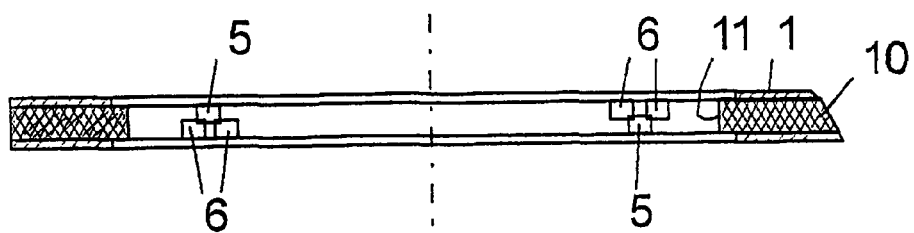
FIG. 4: An inventive flap seal shown in a side sectional view.

FIG. 4, consequently, shows a finished or completely worked flap disc seal with an upper cover ring 1 and a lower cover ring 1, as well as a seal ring 10 disposed therebetween. The outer circumferential surface of the flap seal is configured via cutting or shaving work in correspondence with the configuration of a conical section of an inclined or tapered circular cone.

The preparation of the flap seal as shown in FIG. 4 comprising the components shown in FIGS. 1–3, is effected in the following manner:

Initially, two identical cover rings 1 are prepared from suitable sheet metal, such as, for example, via laser cutting. The clips 3 are bent out to one side of the plane of the cover ring 1. The seal ring 10 is formed out of a suitable material in a similar manner. The material can, in this connection, be a halogenated plastic, graphite, or can be, as well, metal. A plurality of seal rings 10 can also be deployed.

Now the seal ring 10 is engaged on both sides by respective cover rings 1 and, indeed, in a manner such that the markings 7 of the two cover rings 1 coincide with one another in the axial direction. The clips 3 of the cover rings 1 face one another. Via this orientation, the nose-shaped positioning means 5 are received in the in-between spaces of the fork-shaped means 6. The fork-shaped positioning means 6 are disposed in the cutouts 12 of the seal ring 10. In this manner, both cover rings 1, as well as the seal ring 10, are secured against turning movement and displacement movement in the plane of the ring. The arrangement remains, however, axially compressible.

The packet is now pressed in a suitable apparatus and subjected to working such that the conventional outer contour, as shown in FIG. 4, is produced. Now, the individual rings can be again taken apart from one another and the worked outer side can be de-burred, such that a desired top surface quality is achieved. due to the unique fixed securement of the flap seal via the positioning means 5, 6 and the cutouts 12, the re-assembly together of the cover rings 1 and the seal ring 10 leads to the flap seal being assembled together in the same orientation as it had as it was subjected to working. Thereafter, the assembled packet can be mounted in a conventional mounting of a flap seal valve via axial pressing.

The assembly comprises in its entirety a flap seal which provides a substantially improved top surface quality with relatively simple working.

In contrast to the heretofore known flap seals, the inventive flap seal provides the further advantage that the individual rings no longer need be adhered to one another or welded to one another. This work step can be omitted. In contrast to flap seals formed by adhesion, the further advantage is obtained with the inventive flap seal that, for the first time, PTFE-comprising seal rings, which cannot be adhered to one another, can be used. It is additionally possible to finish the outer contours of the cover rings slightly smaller than the seal ring. In this manner, it can be avoided that the valve seat comes into contact with the cover rings and eventually prematurely wears away the cover rings.

These significant advantages are provided not only in connection with the illustrated arrangement of two cover rings 1 and a seal ring 10. Rather, seal rings comprising alternating graphite and metal rings or a large number of graphite rings can also be deployed. It is also possible to deploy a plurality of seal rings 10, which are collectively formed of metal. The separate follow-on work possibilities permit, as well, a high level of quality of the subsequently formed seal surfaces.

In addition to the afore-described embodiments, the seal ring can also comprise an inner circumferential surface which deviates from the afore-described sleeve surface of an annular cylinder. Thus, for example, the inner cutout delimited by the seal ring can have multiple angles and, especially, can have a quadratic shape.

The specification incorporates by reference the disclosure of German priority document 100 30 300.5 filed Jun. 27, 2000 and PCT/EP01/02770 filed Mar. 13, 2001.

The present invention is, of course, in no way restricted to the specification disclosure of the specification and drawings, but also encompasses any modification within the scope of the appended claims.

What is claimed is:

1. A flap seal comprising:
   at least one seal ring having an inner cutout forming an inner surface; and
   at least two cover rings each having an inner cutout forming an inner surface, the cover rings and the seal ring being stacked one upon the other such that the seal ring is intermediate the cover rings relative to a stacking axis, and the cover rings including positioning means operable to maintain at least one of the cover rings at fixed relative circumferential positions to one another and the cover rings at fixed radial positions relative to the seal ring while permitting relative movement of the rings in the axial direction.

2. A flap seal according to claim 1, wherein the positioning means of the cover rings include clips arranged in the region of the inner circumferential surfaces, the clips extending outwardly from the plane of the cover rings.

3. A flap seal according to claim 2, wherein each clip includes a receiving component having a press fit gap and an insertion component receivable in the press fit gap of the receiving component with respective ones of the receiving components extending from one of the cover rings and respective ones of the insertion components extending from the other cover ring such that each respective insertion component on a cover ring is received in a press fit manner in a respective receiving component to thereby effect releasable securement of the cover rings to one another.

4. A flap seal according to claim 2, wherein the receiving and insertion components of the clips are arranged in alternating manner in the circumferential direction of the inner circumferential surface of the cover rings.

5. A flap seal according to claim 1, wherein both cover rings are identically configured and are arranged with their positioning means facing one another, with the positioning means being in the form of clips, each clip including a receiving component having a press fit gap and an insertion component receivable in the press fit gap of the receiving component with respective ones of the receiving components extending from one of the cover rings and respective ones of the insertion components extending from the other cover ring such that each respective insertion component on a cover ring is received in a press fit manner in a respective receiving component to thereby effect releasable securement of the cover rings to one another.

6. A flap seal according to claim 1, wherein the positioning means is disposed on the inner circumferential surface of the seal ring so that the seal ring is secured relative to the cover rings in the radial direction.

7. A flap seal according to claim 1, wherein both cover rings are in contact via their positioning means at at least three locations with the inner circumferential surface of the seal ring.

8. A flap seal according to claim 1, wherein the inner circumferential surface of the inner seal ring comprises cutouts in which the positioning means are received and which fix the seal ring in the circumferential direction relative to both cover rings.

9. A flap seal according to claim 1, wherein the seal ring is formed of a plastic material, especially a PTFE-comprising plastic, or graphite.

10. A method for producing a packet-type flap seal having individual rings, the method comprising:

stacking at least one seal ring having an inner cutout forming an inner surface and at least two cover rings each having an inner cutout forming an inner surface in a designated serial arrangement, the cover rings and the seal ring being stacked one upon the other such that the seal ring is intermediate the cover rings relative to a stacking axis, and positioning means of the cover rings operate to maintain at least one of the cover rings at fixed relative circumferential positions to one another and the cover rings at fixed radial positions relative to the seal ring while permitting relative movement of the rings in the axial direction;

finishing the outer contour of the flap ring via cutting or shaving work;

separating the individual rings;

de-burring the individual rings, to the extent required; and assembling together the individual rings in the original orientation and serial arrangement to thereby dispose the flap seal in condition for subsequent mounting thereof under axial pressure in a sealing location.

* * * * *